United States Patent [19]

Hodges

[11] 4,191,451
[45] Mar. 4, 1980

[54] PROJECTION SCREEN AND METHOD OF MAKING SAME

[75] Inventor: Marvin P. Hodges, Woodland Hills, Calif.

[73] Assignee: Marv Hodges, Inc., St. Petersburg, Fla.

[21] Appl. No.: 898,837

[22] Filed: Apr. 21, 1978

[51] Int. Cl.² .............................................. G03B 21/60
[52] U.S. Cl. .................................... 350/126; 350/105; 428/406
[58] Field of Search .................. 350/97, 103, 105, 117, 350/126; 428/402, 406, 308, 325

[56] References Cited

U.S. PATENT DOCUMENTS

| | | | |
|---|---|---|---|
| 3,254,563 | 6/1966 | De Vries et al. | 350/105 |
| 3,637,285 | 1/1972 | Stewart | 350/105 |

FOREIGN PATENT DOCUMENTS 595662 12/1947 United Kingdom .................... 350/106

*Primary Examiner*—Richard A. Wintercorn
*Attorney, Agent, or Firm*—John J. Posta, Jr.

[57] ABSTRACT

The improved projection screen of the invention comprises a substrate of extended area upon which has been deposited, as by printing, or casting, in accordance with the method, a pattern of liquid-containing elements of desired shape and size, which are then solidifed as by drying or chilling, in accordance with the method, to permanent light-affecting form. In one embodiment, the liquid includes a thixotropic agent to aid in shape retention during permanent solidification. Such liquid may comprise a polymer such as polyvinyl chloride, or the like, to which has been added a hardening agent and/or slip agent. Permanent solidification can be accomplished by drying, catalysis, temperature reduction or elevation or any other suitable means.

In another embodiment, a substrate can be extrusion casted or the like with one surface bearing the desired optical shape, or the surface of a preformed heat deformable substrate can be heated and deformed to the desired optical configuration and then solidified, as by chilling.

the solidified optical elements can be in any desired size, pattern, shape and profile thickness and may be transparent or opaque, with or without light-defracting inclusions and/or matte surface portions or the like. The substrate surface to which the elements are attached may be specular, semi-specular, non-specular or transparent and the substrate may be rigid or flexible. The optical elements and/or the substrate can be metallized, if desired. The method is rapid, simple, inexpensive and reproducible and has great flexiblity. The projection screen produced by the method has carefully controlled optical properties which can be tailored for desired applications.

42 Claims, 11 Drawing Figures

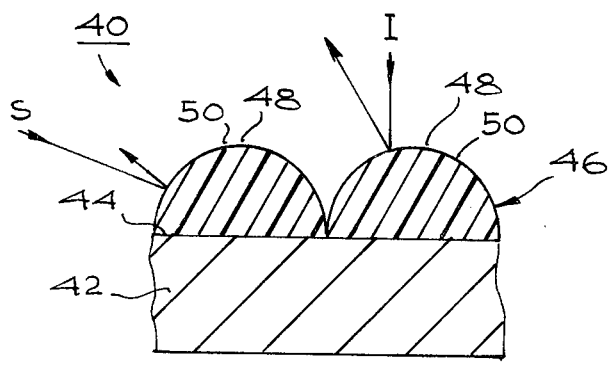
_Fig. 7_
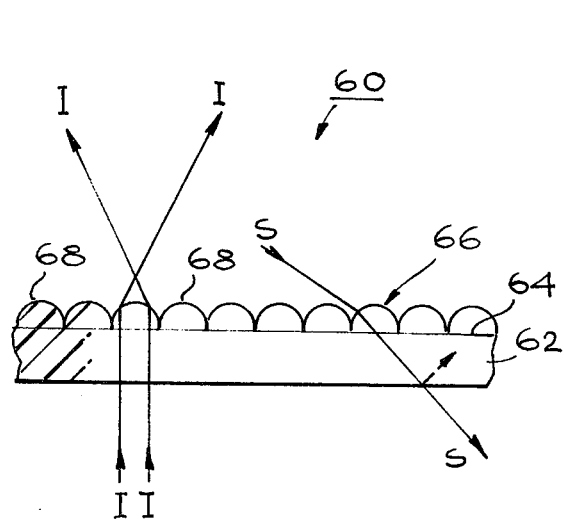
_Fig. 8_
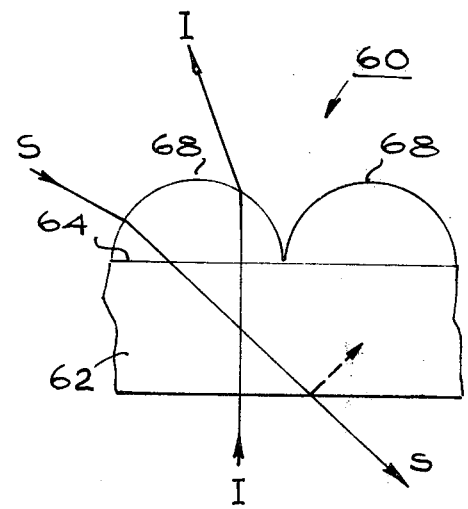
_Fig. 9_
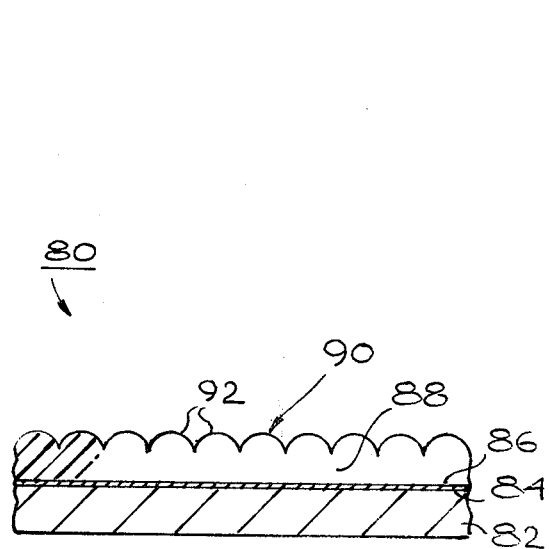
_Fig. 10_
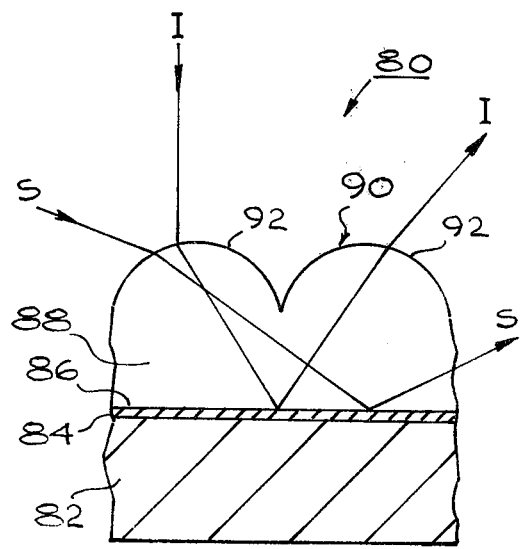
_Fig. 11_

PROJECTION SCREEN AND METHOD OF MAKING SAME

BACKGROUND OF THE INVENTION

1. Field of the Invention

The present invention generally relates to light-reflecting means and more particularly to improved projection screens and methods of making the same.

2. Prior Art

The usual types of projection screens for movie and slide projections and the like are relatively expensive to produce and are relatively inefficient in their light reflecting characteristics. They pursue a compromise between reflectance efficiency, side light rejection, viewing zones and the balance of intensity at off-axis angles, with varying success, depending on the particular arrangement of components. Thus, certain of the screens are fabricated of aluminum or metallized surfaces, while others employ other reflective materials. Various surface embossing techniques have been tried, as well as the addition to screen surfaces of solid particles in the form of beads, fish scales, etc. Most of the screens thus far produced employ random patterns on their reflective surfaces and produce only average results. Moreover, most screen fabricating techniques are not capable of producing high performance screens for widely differing needs.

Accordingly, there is a need for a simple, efficient, inexpensive method of producing high quality projection screens to varied specifications, depending on the end uses. Such method should be capable of producing superior screens, both reflective and refractive, in a minimum amount of time, using readily available materials.

SUMMARY OF THE INVENTION

The foregoing objects are fully accomplished by the method of the present invention and the improved projection screens produced by the method. The method and screens are substantially as set forth in the Abstract above.

The method involves the controlled deposition of liquid-containing elements of predetermined shape onto a flexible or inflexible substrate and then permanently solidifying the elements in place. In one embodiment a thixotropic agent and any one of a variety of known fluids, such as a printing ink, are employed as the liquid deposited in virtually any pattern by an embossing cylinder at high speeds. Commercially available equipment found in packaging, laminating and printing industries can be employed for such purposes. In another embodiment, the elements are cast into a surface and chilled to solidify the elements. Patterns (lens shapes) can vary from quadratic, piramidal, hemispherical, to aspherical, symmetrical, non-symmetrical, corner cubes, or the like. Elements of precise shape and having a height of up to 1/32 of an inch can be easily replicated using the liquid printing technique, by balancing the percentage of solids in the printing liquid, and by controlling the concentration of thixotropic material (oven temperature, etc.) and the setting conditions and deposition speed. Thicker coatings are possible at slower printing speeds and random shapes and thicker coating weights (with some self leveling) can be obtained at higher printing speeds. Through the process of micro-embossing, ultra fine grain elements can be designed of the size order of 600 elements per inch. With the casting technique, much greater optical element height and thickness is possible, and the elements can be more precisely shaped, because the liquid self-leveling potential is reduced or eliminated.

It is possible in accordance with the present method to accurately control the reflectance of specular and semi-specular substrates in order to achieve any desired balance of reflected light into the vertical vs. horizontal viewing zones and to achieve an audience window of any width. In the present method, rejection of side light is no longer a function of a random design but is now controllable and matchable to the viewing zone desired. The method permits precise shapes and angles, using translucent or opaque printing liquid, to be deposited onto both transparent and opaque substrates. Alternatively, casting, such as extrusion casting, can achieve similar results, in accordance with the present method.

The method also permits an equal variety of refractive screens of superior performance and optical range with transparent substrates. With appropriate refractive elements, the transmission of light can be controlled to design an audience viewing zone not now possible in prior art systems, substantially improving the brightness in the primary viewing zone.

Ultra fine grain surfaces can be manufactured for both refractive and reflective screens utilizing state-of-the-art engraving techniques perfected for flexographic and gravure liquids in which volumetric cell capacity is accurately controlled down to 600 lines per inch. Vinyl chloride polymers are preferred as the replication fluid in the printing technique, due to their wide range of plasticization, their compatability to thixotropic agents, their acceptance of catalysts and their ability to be thinned for viscosity control in order to achieve a wider range of patterns. Through plasticization, catalyst additions and slip agents, a complete range of surface specifications can be created for wear and scratch resistance, washability, optical clarity, moisture rejection, etc. However, many solutions developed as transfer and flexographic liquids can also work and can be applied by commercially available equipment used in the printing, packaging and laminating industries. Dependent upon the specification of the screen being manufactured, colored, metallic and reflective fluids (inks) can be employed.

When casting, such as extrusion casting, ionomer plastics are preferred because of their high refractive indices, their toughness and standardization with various extruders.

The printing, packaging and laminating industries have given rise to a wide range of film substrates of superior flatness, gauge profile control and optical clarity, which are useful as substrates for the printed and cast shapes of the current method. Optically graded polyester is an example of one useful substrate. High index liquids, plastics, and the like are also available in quantity in the laminating art. The motion picture industry also offers a wide selection of optically clear film substrates that can be used as the substrate in producing the novel refractive and reflective screens of the present invention. Various heat deformable plastics can be used in the casting technique. Further features of the present invention are set forth in the following detailed description and drawings.

DRAWINGS

FIG. 7 is identical to FIG. 6 except that the hemispheres are opaque so that all reflection is controlled by the air surface and the substrate surface has no reflectivity;

FIG. 8 is an enlarged schematic side elevation of a third preferred embodiment of the improved projection screen of the present invention, the screen employing transparent elements and a transparent substrate;

FIG. 9 is a greatly enlarged schematic side elevation of two clear hemispherical elements and the associated transparent substrate of the screen of FIG. 8;

FIG. 10 is an enlarged schematic side elevation of a fourth preferred embodiment of the improved projection screen of the present invention, the screen employing transparent elements separated from a specular surface on a substrate by a transparent layer; and, FIG. 11 is a greatly enlarged schematic side elevation of two clear hemispherical elements and the associated transparent layer, specular surface and substrate of the screen of FIG. 10.

DETAILED DESCRIPTION

Figure 1:
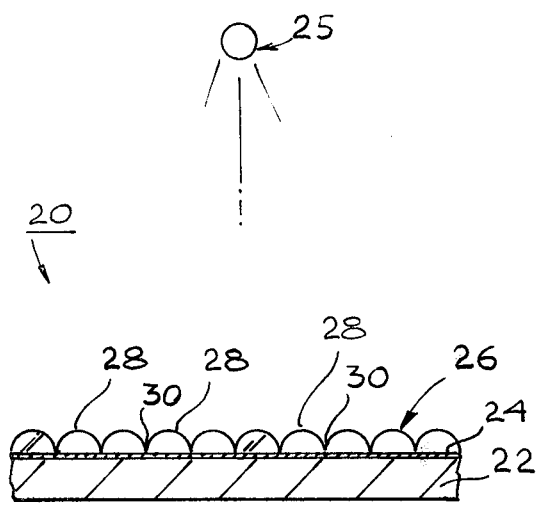
FIG. 1 is an enlarged schematic side elevation of a portion of a first preferred embodiment of the improved projection screen of the present invention, the screen being of the reflector type.
Figure 2:
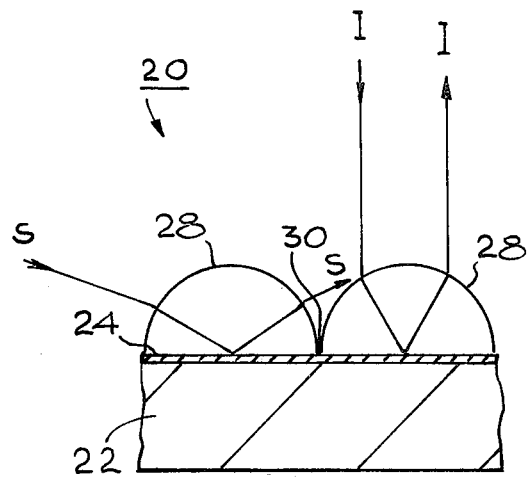
FIG. 2 is a greatly enlarged schematic side elevation of two clear hemispherical elements and the associated specular substrate from the screen of FIG. 1.

FIGS. 1 and 2

Now referring more particularly to FIG. 1 of the drawings, a portion of a first preferred embodiment of the improved projection screen of the present invention is schematically depicted therein in enlarged side elevation. It will be understood that although a movie film or slide projection screen is usually contemplated, in accordance with the present invention the term projection screen also applies to any screen which projects light as a result of reflection therefrom. Thus, it also can include the reflective portion of highway markers, signs or the like.

Screen 20 is shown which comprises a substrate 22 of extended surface area and which may be flexible or inflexible, curved, flat, etc. and prepared of any suitable material, such as fiberboard, cloth, paper, wood, plastic, metal, etc. The front surface 24 of substrate 22, that is, the surface facing the light source 25 during use of screen 20, may be specular, that is, mirror-like and highly reflective. For this purpose, surface 24 can be, for example, of shiny aluminum foil, or may be aluminized or the like.

Screen 20 also includes a light-affecting or light-controlling layer 26 secured to specular surface 24 and projecting toward light source 25. Layer 26 comprises a pattern of discrete elements 28 which have been deposited in liquid-containing form and have permanently solidified to a desired shape, in this instance, hemispherical, with their bases 30 adjoining one another to cover and adhere tightly to surface 24. It will be understood that elements 28 can be of any other desired shape, such as pyramidal, quadratic, cubic, conical, etc.

The method of the present invention is employed in producing elements 28 and causing their solidification and attachment to surface 24. Thus, the present method includes depositing on surface 24 a plurality of the discrete elements 28 of desired shape in liquid-containing form but sufficiently viscous to substantially retain their shape until permanently set to a solid.

The deposition step is carried out in any suitable manner. In accordance with one embodiment of the invention, the elements are printed by an embossed cylindrical imprinter or the like. The printing fluid is that which forms elements 28 and preferably comprises a polymeric liquid which may have a low stage of polymerization and which can be further polymerized to a solid having the desired characteristics. For example, liquid polyester resins, epoxy resins and the like can be catalytically polymerized to solids. Other suitable polymers can comprise, for example, polyethylene or polyvinyl chloride or other thermoplastics which can be heated to above their melting point and printed onto a preferably chilled surface 24 when their temperature is lowered they solidify.

Selected thixotropic agents can be added to certain of the polymers such as polyvinyl chloride to facilitate instant setting and shape retention of elements 28, once printed on surface 24. The usual types of thixotropic agents comprise bentonite clays, various gelatin preparations (proteinaceous sols), and selected concentrated hextraus metal oxide sols to which electrolyte has been added, for example, ferric oxide sols, aluminum trioxide sols and zirconium dioxide sols. Thus, a variety of thixotropic agents can be added to many liquids to provide the desired liquid resting viscosity.

Hardening agents, such as isocyanate prepolymers can be added in weight concentrations of, for example, about 0.05% to about 2% to the printing fluid, so that elements 28 when permanently solidified will have their hardness (molecular weight) increased up to about 50%. Slip agents such as wax and silicone can be used in, for example, about 0.01% to about 0.05% concentration, by weight, in, for example, any of the printing fluids selected. The slip agents bloom, that is, rise to the surface of the printing fluid so that mar resistance of the dried fluid is improved.

In accordance with the present method, elements 28, once printed in a pattern on surfaces 24 are permanently solidified to form a light-affecting array or pattern 26. The step of permanent solidifying can take place through the use of well-known means in the plastics art, for example, catalysis, with or without heat, for thermosetting polymers such as polyesters, epoxies and the like. Alternatively, thermoplastics can be allowed to cool or can be artificially cooled to below their solidification point. Solidification can be accelerated through the use of known, selected accelerators and promoters. In any event, the finished solidified elements 28 firmly adhere to surface 24 to form with substrate 22 the desired improved projection screen 20.

As shown more particularly in FIG. 2, the fluid from which elements 28 of layer 26 are formed has been selected such that elements 28 are transparent. For example, they can comprise set polyvinyl chloride. They are also hemispherical, touching at their bases 30 so as to fully cover specular surface 24. Assuming that elements 28 are perfect hemispheres and that surface 24 is perfectly flat, incident light I will reflect at its angle of entrance. Side light S, depending on its angles, will usually exit at an opposing angle. Any distortion of the hemispherical shape of elements 28, including randomizing of shape and size, will encourage diffusion of incident light without noticeably changing the ability of element 28 to reject side light. Thus, the present method produces an improved projection screen 20 with carefully controlled optical properties.

Figure 3:
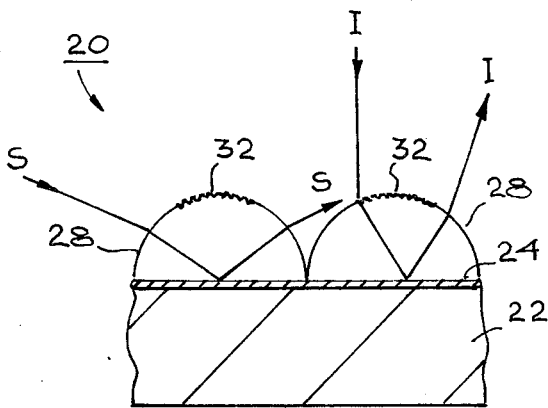
FIG. 3 is identical to FIG. 2 except for the presence of a secondary matte pattern on the surface of the central portion of each of the two deposited hemispheres, facing incident light, for greater diffusion.
Figure 4:
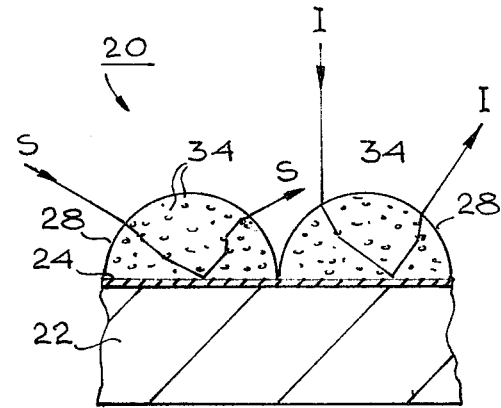
FIG. 4 is identical to FIG. 2 except that the two hemispherical elements are shown with particles of a matting agent mixed therein for added control of light dispersion.

FIGS. 3 and 4

In FIGS. 3 and 4, there are shown schematically modifications of elements 28 of screen 20. Thus, in FIG. 3, elements 28 are hemispherical, but include matte patterns 32 on a portion of the surface thereof facing incident light. Matte patterns 32 can be impressed into the desired surfaces before elements 28 are fully set or tooled into the embossed cylinder and, depending on their nature, size and location, can provide any desired degree of diffusion of incident light I striking and reflecting from specular surface 24. Side light S remains unaffected.

In FIG. 4, hemispherical elements 28 contain therein a plurality of discrete dispersed particular inclusions 34 of material such as silica or ground polyethylene or insoluble ionomer, of a different refractive index from that of the matrix of elements 28. Thus, for example, particles 34 can be opaque, translucent, etc., can be in any suitable concentration and of any suitable size. They have the effect of dispersing both incident light I and side light S, and the intensity of the effect will vary with concentration, size, refractive index and other characteristics of particles 34.

Figure 5:
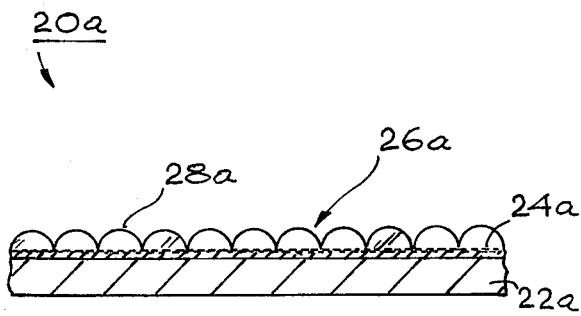
FIG. 5 is an enlarged schematic side elevation of a portion of a second preferred embodiment of the improved projection screen of the present invention, the screen having a substrate bearing a semi-specular surface.
Figure 6:
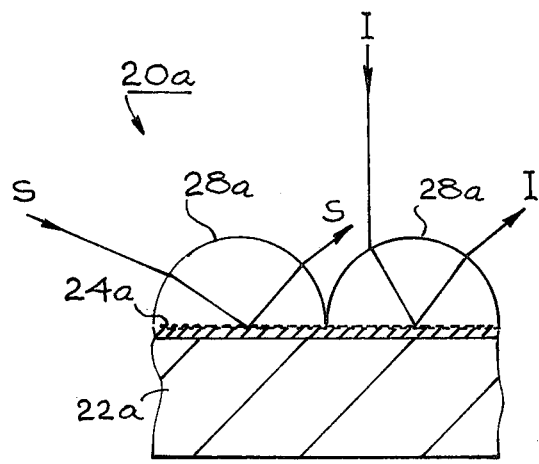
FIG. 6 is a greatly enlarged schematic side elevation of two clear hemispherical elements and the associated substrate of the screen of FIG. 5.

FIGS. 5 and 6

A second preferred embodiment of the improved projection screen of the invention is schematically set forth in FIGS. 5 and 6. This embodiment is similar to that of FIG. 1 and similar components bear the same numerals but are succeeded by the letter "a". Thus screen 20a is shown, which includes a substrate 22a having a reflective semi-specular surface 24a of, for example, texturized aluminum foil or the like, to which is attached a layer 26a of hemispherical transparent elements 28a formed in accordance with the present method. Incident light I is somewhat diffused by surface 28a (FIG. 6), while side light S is not materially altered by the diffusion characteristics of surface 24 at the angles shown, although at angles closer to the axis position, a semi-specular surface will introduce increasing impingement with incident light. The screen 20a has the main characteristics and advantages of screen 20.

FIG. 7

FIG. 7 illustrates a modification in the projection screen of the present invention. Thus, a screen 40 is shown which includes a substrate 2 having surface 44 which is neither specular nor semi-specular, but has attached thereto a patterned layer 46 of opague hemispherical elements 48 preferably formed by the present method. Both incident light I and side light A are reflected from the exposed surfaces 50 of elements 48. If elements 48 are perfectly hemispherical, they will act as a lambertian reflector. The substrate 22 is only a carrier for layer 46. Side light rejection is less effective in this embodiment. Components of screen 40 can be fabricated from materials similar to those previously described for screens 20 and 20a.

FIGS. 8 and 9

FIG. 8 illustrates a translucent refractive projection screen 60. Thus, screen 60 includes a transparent substrate 62, for example, of flexible plastic, such as clear polymethacrylate, polyvinyl chloride, polyethylene, polyester or the like, or of rigid material such as glass, etc. To the front surface 64 of substrate 62 is attached a patterned layer 66 of transparent hemispherical elements 68 formed of the same material as substrate 62 in a separate operation. The material constituting elements 68 can be any which is transparent in the solid state and can provide the desired results. Preferably, substrate 62 and elements 68 have the same index of refraction. It will be understood that surface 64 may not be visible, since it can be optically coupled to layer 66. A refractive screen such as screen 60 is employed by having the light source and viewing zone on opposite sides of the screen.

As can be seen from FIGS. 8 and 9, the latter an enlarged version of a portion of FIG. 8, side light S does not interfere with viewing. The extent of deflection of incident light I depends on the shape of elements 68. Designs controlling the critical angle (total reflection) can be varied, as desired. It will be understood that, if desired, light dispersing means, including matte areas as well as particulate inclusions in elements 68 can be employed.

It can readily be appreciated that projection screen 60 of FIGS. 8 and 9 can readily be converted to a system having the light source and viewing zone on the same side of the screen by either providing a metallized coating on the outer surface of the substrate 62 or the surface of hemispherical elements 68.

FIG. 10

FIG. 10 illustrates a projection screen 80 which includes a substrate 82, for example of cloth, fiberboard, wood, metal, plastic or the like, to the front surface 84 of which is attached a specular surface 86 of, for example, metallic foil or the like, in turn covered by a transparent layer 88 the front (upper) surface 90 of which is configured into transparent hemispherical elements 92 in a pattern. Thus, screen 80 is somewhat similar to screen 20 of FIG. 1, except that elements 92 do not reach specular surface 86, as do elements 28 in relation to specular surface 24. Instead, layer 88 is interposed.

FIG. 11

FIG. 11 shows that side light S does not interfere with viewing and that incident light I is reflected, with the extent of deflection depending on the shape and position of hemispheres 92.

In accordance with one embodiment of the present invention, liquid-containing hemispheres 92 can be formed in surface 90 of layer 88 during or after casting layer 88, as by conventional extrusion casting, including or followed by the step of contacting surface 90 with an embossing fixture to shape elements 92. For such purposes, clear thermoplastic resin, preferably polyethylene can be cast, as by extrusion casting. Polyethylene has a low index of refraction and is well suited for casting elements for wide angle viewing.

It is also preferred to use ionomers. These are cross-linked polymers in which the linkages are ionic as well as covalent bonds. Ionomer resins usually are copolymers of sitylene and vinyl monomer with an acid group such as methacrylic acid. One such series of resins is sold under the U.S. registered trademark "Surlyn" by E. I. duPont de Nemours & Company, Wilmington, Delaware. Surlyn A utilizes carboxyl groups located along the polymer chain to provide the cationic portion of the cross-links. Metal ions provide the onionic portion. Surlyn D is a copolymer of ethylene with small amounts of sodium methacrylate and methacrylic acid. These resins are high molecular weight themoplastics which are flexible, transparent, grease-resistant, light in weight and touch, with high impact and tensile strength. They can be thermoformed, or injected or blow molded.

Extruded castings of the nature of layer 88 with elements 92 in accordance with the present method can vary in thickness from about 0.00025 inch to about 0.005 inch for additional optical effects, the minimum thickness being partly dependent on the size and structure of the optical elements 92 being formed, while the maximum thickness is controlled by the specified light absorption and dispersion characteristics established for layer 88 and elements 92.

Polyethylene can be conveniently used as a matting agent when mixed with the ionomer. Casting particular extrusion casting has the advantage of being capable of producing greater height and coating thickness for elements 92 (with layer 88) than if the novel printing technique of the invention is employed. Moreover, the optical elements such as elements 92 formed can be more carefully controlled with respect to shape, size, regularity, etc.

It should be understood that for the purposes of the present invention, the casting technique, preferably extrusion casting, is considered to involve forming the optical elements in at least partially softened viscous liquid form (since the surface must be made to flow into the proper shape) and then solidifying them to permanent form, as by chilling, etc. Included in this technique is also the possibility of first forming and solidifying a suitable substrate surface and later deforming it (partially liquidifying it) under heat, pressure, etc., as by a heated embossing cylinder, to produce the optical elements. The casting technique is fully capable of producing each of the screens illustrated in FIGS. 1–11.

Further features of the invention are illustrated by the following specific examples:

EXAMPLE I

In a first run, an improved projection screen is fabricated in accordance with the method of the present invention by contracting the mirror-like aluminumized foil surface of a polyethylene substrate with printing fluid delivered by an embossed printing roll so as to print off a desired pattern of transparent light-affecting elements. The printing fluid consists of the following ingredients, in percent by weight of the total fluid: 30% of polyvinyl chloride thinned with methyl ethyl ketone, 1% of ferric oxide sol as the thixotropic agent, 0.2% of silicone slip agent and 1.5% of an isocyanate prepolymer hardening agent. The resting viscosity of the fluid is sufficiently high so that the elements printed on the aluminum foil can be permanently set without sagging. The elements have the following size and shape and are arranged in the following pattern: hemispherical, touching at the base, diameter about 1/64 inch.

The elements, printed off in liquid form are permanently set in place, in accordance with the following method, by drawing off the methyl ethyl ketone in an oven stage at 225° F., with a dwell time of 4.8 seconds (20 foot long oven and a line speed of 250 feet per minute). It is found that the projection screen, thus easily, rapidly and inexpensively produced, has superior optical properties and durability.

In a second run, the procedure of the first run is followed, except that the printing fluid and thus the elements contain light diffusing silica particles in a concentration of about 5 percent by weight of the fluid mix. Moreover, the optical elements are generally ovoid with flat bottoms and have a maximum diameter of about 1/64 inch.

In a third run, the procedure of the first run is repeated, except that the printing cylinder has a secondary matte pattern which appears on the apices of the elements and functions as an additional light diffusing element to the light modifying hemispheres. This matte pattern influences both incoming and exiting light radiation.

EXAMPLE II

The procedure of the first run of Example I is followed in the fabrication of an improved screen, except that opaque elements are printed on a non-specular substrate, comprising polyethylene, while utilizing a commercial flexographic printing ink known as silver metallic flexographic ink #5560 manufactured by Printers Ink, Inc.

EXAMPLE III

The procedure of the first run of Example I is exactly followed in the fabrication of an improved projection screen of the refraction type, except that a transparent substrate comprising polyester is employed.

EXAMPLE IV

In a first run, optical elements of the size, shape and pattern of those of the first run of Example I are formed in one surface of a polyethylene sheet about 1/64 inch thick during extrusion casting of the sheet at above 580° F., whereupon the opposite surface of the sheet while still tacky is attached to aluminized surface of a polyethylene substrate and the structure cooled to below the solidification point to form a finished projection screen. The screen has the improved optical properties and durability of that of Example I and is particularly suitable for wide angle projection.

In a second run, otherwise identical to the first run, Surlyn A is used at about 600° F. in place of the polyethylene in the extrusion casting step. The resulting screen is similar in quality to that of the first run of this Example, but has a harder, more impact resistant optical element-containing surface with somewhat different optical characteristics.

The transparent screen produced in accordance with the present method has superior optical properties over conventional screens. It can be made so that side light does not impinge on incident light. Moreover, the screens of the present invention, including those of the specific Examples are inexpensive and can be made easily and rapidly. They are durable and easily cleaned and maintained. Their precise optical properties can be readily controlled to tailor them to a wide variety of special needs. Various other advantages as are set forth in the foregoing.

Various modifications, changes, alterations and additions can be made in the present method, its steps and parameters and in the present projection screen, its components and parameters. All such modifications, changes, alterations and additions as are within the scope of the appended claims form part of the present invention.

I claim:

1. An improved projection screen, said screen comprising, in combination:
    a. a substrate,
    b. a layer comprising a plurality of discrete shaped light-affecting elements deposited on said substrate,
    c. wherein said elements are shaped by a patterned tool and subsequently deposited in a liquid state on said substrate.

2. The improved projection screen of claim 3 said elements include a thixotropic agent.

3. The improved projection screen of claim 1 wherein said elements comprise a polymeric substance.

4. The improved projection screen of claim 3 wherein said polymeric substance comprises polyvinyl chloride.

5. The improved screen of claim 3 wherein said elements include at least one of a hardening agent and a slip agent, the latter to improve scratch resistance of said top layer.

6. The improved projection screen of claim 1 wherein said elements are transparent and said substrate is at least semi-specular.

7. The improved projection screen of claim 6 wherein said substrate is specular.

8. The improved projection screen of claim 6 wherein said elements include discrete light-refracting particles.

9. The improved projection screen of claim 6 wherein said elements contain matted surface areas thereon imparted by said tool.

10. The improved projection screen of claim 6 wherein said elements are lens-shaped.

11. The improved projection screen of claim 10 wherein the bases of said lenses adjoin one another.

12. The improved projection screen of claim 1 wherein said elements and said substrate are transparent.

13. The improved projection screen of claim 1 wherein said elements are opague.

14. An improved projection screen, said screen comprising, in combination:
    a. a substrate; and,
    b. a layer comprising a plurality of discrete solidified elements disposed in a light-affecting pattern on and attached to one surface of said substrate, wherein said elements are cast into the surface of said substrate and chilled to solidified form.

15. The improved projection screen of claim 14 wherein said elements are extrusion cast material selected from the group consisting of ionomer resins and polyethylene.

16. The improved projection screen of claim 12 wherein one side of said screen is metallized.

17. The improved projection screen of claim 16 wherein said elements include discrete light-refracting particles.

18. The improved projection screen of claim 16 wherein said substrate includes discrete light refracting particles.

19. The improved projection screen of claim 16 wherein said elements and said substrate include discrete light refracting particles.

20. The improved projection screen of claim 16 wherein said substrate has a matted surface.

21. An improved method of making a projection screen, said method comprising:
    a. pre-forming in a patterned tool a plurality of light-affecting discrete elements in liquid form,
    b. depositing said elements in an array on the surface of a substrate; and,
    c. solidifying said elements to permanent form to form a light-affecting pattern on said substrate.

22. The improved method of claim 21 wherein said liquid includes a thixotropic agent to facilitate stabilization of said element shape until said permanent solidification.

23. The improved method of claim 22 wherein said liquid includes a polymeric substance.

24. The improved method of claim 23 wherein said polymeric substance comprises polyvinyl chloride.

25. The improved method of claim 23 wherein said liquid includes at least one of a catalytic hardening agent and a slip agent.

26. The improved method of claim 21 wherein said solidified elements are transparent and said substrate is at least semi-specular.

27. The improved method of claim 26 wherein said substrate is specular.

28. The improved method of claim 26 wherein solidified elements include discrete light-diffracting particles.

29. The improved method of claim 26 wherein said solidified elements contain matted surface areas.

30. The improved method of claim 26 wherein said solidified elements are lens-shaped.

31. The improved method of claim 30 wherein the bases of said lenses adjoin one another.

32. The improved method of claim 21 wherein said solidified elements and said substrate are transparent.

33. The improved method of claim 21 wherein said solidified elements are opaque.

34. The improved method of claim 21 wherein said depositing is by casting and said solidifying is by cooling.

35. An improved method of making a projection screen, said method comprising:
    a. depositing a plurality of discrete liquidic elements of desired shape in an array on the front surface of a substrate; and,
    b. solidifying said elements to permanent form so as to secure them to said substrate and to form a light-affecting pattern on said substrate, wherein said casting is extrusion casting and said elements are cast from material selected from the group consisting of ionomer resins and polyethylene.

36. An improved projection screen comprising:
    a. a substrate,
    b. a plurality of light-affecting elements secured to a surface of said substrate,
    c. said elements being deposited on said substrate in a liquid state by a printing tool,
    d. said elements shaped to a desired configuration by said printing tool prior to being deposited on said substrate.

37. The projection screen of claim 36 wherein said elements include a thixotropic agent.

38. The projection screen of claim 36 wherein said elements comprise a polymeric substance.

39. The projection screen of claim 37 wherein said configuration is hemispheric.

40. The projection screen of claim 39 wherein said elements include a hardening agent.

41. The projection screen of claim 39 wherein said elements include a slip agent, the latter to improve scratch resistance of said top layer.

42. The improved projection screen of claim 39 wherein said elements have a matted surface area.

* * * * *